Patented Aug. 28, 1928.

1,682,250

UNITED STATES PATENT OFFICE.

FRANK H. RIDDLE, OF DETROIT, MICHIGAN, ASSIGNOR TO CHAMPION PORCELAIN COMPANY, OF DETROIT, MICHIGAN, A CORPORATION OF MICHIGAN.

CERAMIC MATERIAL.

No Drawing. Original application filed June 1, 1920, Serial No. 385,512. Divided and this application filed January 3, 1921. Serial No. 434,703.

My invention has for its object to provide ceramic bodies to be used, particularly, for bodies where hardness or toughness are required; for bodies where dielectric strength is required to withstand high tension currents; for insulators that are to be subjected to high temperatures; for bodies that are to be subjected to rapid thermal changes; for bodies that are to be subjected to mechanical strains or vibrations, and for bodies requiring any number of these properties, such as ball mill linings, textile eyelets, runners or guides, cooking ware, electric insulators such as spark plug porcelains, high tension porcelains, and discharge and collecting electrodes for separation of suspended particles in such processes as the Cottrell process.

The invention consists in the compositions of the raw batches from which the ceramic bodies are formed, and in the processes of making the porcelains as well as in compositions of porcelains themselves. This case is a division of application #385,512, filed June 1, 1920, issued June 7, 1927, as Patent #1,631,695.

It has been demonstrated that both feldspar and potter's flint are detrimental when incorporated into the batch composition from which porcelain products, having one or more of the described properties, are made. The feldspar, on account of its alkali metal content, produces a porcelain having a low dielectric strength at high temperatures. Potter's flint results in the incorporation of free quartz or silica in the porcelain, and porcelains having free quartz are subject to volumetric changes greater than those that can be explained solely by thermal expansion and are therefore liable to internal strains and fractures. I have overcome these objectionable features incident to porcelain manufacture by incorporating alumina in the raw batches, from which porcelain bodies are formed, in such a quantity that it will form with silica, a material amount of 3—2 aluminum silicate or artificial or synthetic sillimanite having the formula $3Al_2O_3 2SiO_2$. Preferably such an amount of alumina is used that a relatively large amount of the 3—2 aluminum silicate will be produced in the final body, such as 30% to 70%. In order to produce bodies that are to be subjected to high temperatures, that is, to produce refractory bodies, the maximum amount of the 3—2 aluminum silicate is formed from alumina and silica. In refractory bodies, the amount of the 3—2 aluminum silicate may vary from 70% to 99%. The silica may be introduced into the raw batch of the ceramic bodies as potter's flint, but preferably it is introduced combined with some of the alumina of the batch by the use of clay. Thus, varying proportions of clay and alumina may be mixed to form the raw batches for the porcelain bodies. If the ingredients of the batches do not contain fluxing oxids of the desired character or amount to produce the proper maturity of the bodies, they may be added to the batches.

In forming the raw batches for the ceramic bodies embodying my invention I use natural or prepared fluxes, in which alkaline earth metal oxides are the basic constituents, and one or more raw or prepared materials continuing alumina as their basic constituent, with the desirable amounts of raw clays consisting of kaolin alone or a mixture of kaolin and ball clays in such varied proportions as to produce the above mentioned desired properties and in proper proportions for plasticity and practical working and firing properties so that upon firing the batches to the required temperature ceramic bodies will be produced that are vitrified and which will contain a large amount of 3—2 aluminum silicate, a small amount of glassy matrix and no free quartz, substantially all of the silica being either dissolved or combined in or with the materials or compounds of the ceramic body.

In order to regulate the forming conditions of the batches, to reduce the shrinkage in drying and burning, calcined or dehydrated clay may be used in the batch with the raw clay and the alumina.

The alkaline earth metal oxides may be introduced by using any of a great variety of the compounds containing the alkaline earth metals such as talc, magnesite, whiting, dolomite, or beryllium barium, strontium, etc. Under some circumstances, compounds containing alkali metals may be substituted for the alkaline earth metal compounds, lithium compounds being especially suitable for this substitution. The alkaline earth metal oxides of the flux accelerate the formation and crystallization of sillimanite and greatly increase the toughness of the final body.

The porcelains are formed of materials that contain the essential constituents of the final body, such as by using alumina and alkline earth metal compound and raw clay, the raw clay being formed, preferably, of mixtures of clay to produce the proper workable conditions in the raw batch.

The compositions involving my invention are prepared by the usual processes of milling, blunging and filter pressing and are formed into the desired shapes. They are then fired under the proper reducing, oxidizing or neutral conditions to the required temperature and at the proper rate and the temperature is maintained for the proper length of time. The materials that form the raw batch are mixed in such proportion that no firing to the required temperature to thoroughly vitrify the mass, and for the proper length of time to permit the proper reactions to reach completion, the maximum amount of sillimanite and a small amount of glass matrix will be formed and practically all of the free silica will be dissolved in the glassy matrix. These proportions however may be varied to produce bodies having the above described properties within proper limitations of the claims such as 1.5 to three per cent of basic oxides in the raw materials, and alumina and clays in amounts to produce from about sixty per cent to eighty-five per cent crystallized aluminum silicates in the final product.

Examples of compositions embodying my invention are given in the following table:

| Raw batch of the body | | Calculated end products in fired body | | Collected totals | Collected totals, 100% basis |
|---|---|---|---|---|---|
| $Al_2O_3$ | 6.61 | $3Al_2O_3\cdot 2SiO_2$ | 58.39 | 58.39 | 68.37 |
| $MgCO_3$ ($MgO$ 1.89%) | 3.96 | Glassy matrix | 27.01 | 27.01 | 31.63 |
| Ball clay | 10.00 | Volatile | 2.07 | | |
| Kaolin | 79.43 | Water | 12.53 | | |
| | 100.00 | | 100.00 | 85.40 | 100.00 |

The bodies made from the compositions involving my invention may be glazed or unglazed depending upon the use to which the objects are to be put. The "fitting" of the glaze may require certain changes in the body composition in the manner well known in the art and it is to be understood that these changes may be made without departing from the spirit of my invention.

In some of the claims I have specified a single compound of a particular class, but it is to be understood that the claims cover and comprehend in each case one or more compounds or mixtures of compounds of that class. Also where I refer to the amount of the flux in the claims I have reference to the amount of the basic oxides of the fluxing materials and it is to be understood that materials having equivalent basic oxides of the same general character are to be included and covered by such claims.

By homogenous body, as used in the appended claims, is meant a body which does not contain any separate particles visible to the naked eye, although microscopic analysis may reveal separate crystals.

I claim:—

1. A raw batch for ceramic bodies comprising uncombined alumina, clay and a flux, the alumina being in such condition and amount that it will combine with the other materials to form aluminum silicate, upon firing.

2. A raw batch for a ceramic material comprising uncombined alumina and materials containing silica, the alumina being in such condition and amount as to unite with the silica and form sillimanite, upon firing.

3. A raw batch for a ceramic material comprising clay and alumina, the alumina being in proper condition and amount to unite with excess silica of the clay and form sillimanite, upon firing.

4. A raw batch for a ceramic material comprising alumina and silica united in a proportion leaner in alumina than is sillimanite, and uncombined alumina in an amount to bring the total content of alumina and silica nearer to their proportion in sillimanite.

5. A raw batch for a ceramic material containing uncombined alumina and sufficient siliceous material to unite with substantially all of the alumina in the body to form sillimanite.

6. A raw batch for ceramic product, consisting of uncombined alumina, siliceous materials, and a flux, the alumina being in such condition that the major portion thereof will combine with silica in the siliceous material to form aluminum silicate when the batch is fired.

7. A raw batch for ceramic product, consisting of uncombined alumina, clay, and a flux, the alumina being in such a condition that it will combine with the silica of the clay to form aluminum silicate when the batch is fired.

8. A raw batch for ceramic product, consisting of uncombined alumina, clay, and 1.5% to 3% of an oxide or basic metal, the alumina being in such a condition that it will combine with the silica of the clay to form aluminum silicate when the batch is fired.

9. A raw batch for ceramic product, consisting of uncombined alumina, clay, and 1.5% to 3% of the oxide of an alkali earth metal, the alumina being in such a condition that it will combine with the silica of the clay to form aluminum silicate when the batch is fired.

10. The process which consists in making a mixture of uncombined alumina, clay, and a flux, and firing the mixture so that the major portion of the alumina, including the alumina in the clay, combines with silica from the clay to form aluminum silicate.

11. The process which consists in making a mixture of uncombined alumina, clay, and a flux, and firing the mixture so that substantially all of the alumina, including the alumina in the clay, combines with silica from the clay to form aluminum silicate, any excess silica from the clay forming a glassy matrix with the flux.

12. The process which consists in making a mixture of uncombined alumina, clay, and a material amount of an alkaline earth metal compound, and firing the mixture so that the major portion of the alumina, including the alumina in the clay, combines with silica from the clay to form aluminum silicate.

13. The process which consists in making a mixture of uncombined alumina, clay, and a material amount of an alkaline earth metal compound, and firing the mixture so that substantially all of the alumina, including the alumina in the clay, combines with silica from the clay to form aluminum silicate, and any excess silica from the clay forms a glassy matrix with the flux.

14. The process which consists in forming a mixture of uncombined alumina, magnesium carbonate, ball clay and kaolin, and firing the mixture until a major portion of the alumina, including the alumina in the ball clay and koalin, unites with silica from the clay and kaolin to form aluminum silicate.

15. The process which consists in forming a mixture consisting of uncombined alumina, clay, and a flux, and firing the mixture so that it is transformed into aluminum silicate crystals and a vitreous matrix.

16. The process which consists in forming a mixture containing uncombined alumina and enough silica to unite with all of the alumina to form sillimanite, and firing the mixture until substantially all of the alumina is combined with silica.

17. The process which consists in forming a mixture containing a combination of alumina and silica leaner in alumina than is sillimanite, and enough uncombined alumina to bring the total ratio of alumina to silica in the mixture nearer to that of sillimanite, and firing the mixture until substantially all of the uncombined alumina is united with silica.

18. The process which consists in forming a mixture containing uncombined alumina and siliceous materials, and firing the mixture until substantially all of said alumina combines with silica.

19. The process which consists in forming a mixture containing uncombined alumina and refractory aluminum silicate and firing the mixture until substantially all of said alumina combines with silica.

In testimony whereof, I have hereunto signed my name to this specification.

FRANK H. RIDDLE.